United States Patent
Tiefenbrunn et al.

(10) Patent No.: US 11,609,486 B2
(45) Date of Patent: Mar. 21, 2023

(54) BASE PLATE FOR PHOTOGRAPHIC APPARATUS

(71) Applicants: Larry J Tiefenbrunn, East Brunswick, NJ (US); Merin Swasey, North Logan, UT (US)

(72) Inventors: Larry J Tiefenbrunn, East Brunswick, NJ (US); Merin Swasey, North Logan, UT (US)

( * ) Notice: Subject to any disclaimer, the term of this patent is extended or adjusted under 35 U.S.C. 154(b) by 0 days.

(21) Appl. No.: 17/548,563

(22) Filed: Dec. 12, 2021

(65) Prior Publication Data

US 2022/0357638 A1 Nov. 10, 2022

Related U.S. Application Data

(60) Provisional application No. 63/186,107, filed on May 8, 2021.

(51) Int. Cl.
*G03B 17/56* (2021.01)
*F16M 11/38* (2006.01)

(52) U.S. Cl.
CPC ........... *G03B 17/561* (2013.01); *F16M 11/38* (2013.01)

(58) Field of Classification Search
None
See application file for complete search history.

(56) References Cited

U.S. PATENT DOCUMENTS

| | | | |
|---|---|---|---|
| 9,625,790 B2* | 4/2017 | Tiefenbrunn | F16M 11/32 |
| 11,009,180 B2* | 5/2021 | Geerds | F16M 11/14 |
| 2015/0234258 A1* | 8/2015 | Hida | F16M 11/045 396/428 |
| 2016/0216596 A1* | 7/2016 | Hart | F16M 11/045 |
| 2017/0045180 A1* | 2/2017 | Schaeffer | F16M 11/046 |

* cited by examiner

*Primary Examiner* — Rodney E Fuller
(74) *Attorney, Agent, or Firm* — Henry I. Schanzer (57) ABSTRACT

A base plate for the mounting thereon of photographic equipment includes leveling screw assemblies securely attached to the base plate. Each leveling screw assembly includes a leveling screw and a controlling mechanism for housing and retaining the leveling screw while enabling the leveling screw to: (a) be deployed at various selected angles relative to the base plate to grip an underlying surface; (b) be rotated to enable up-down motion between the leveling screws and the base plate; and (c) be retracted to a predetermine position alongside the base plate for safe storage and ease of reuse.

17 Claims, 13 Drawing Sheets

BASE PLATE FOR PHOTOGRAPHIC APPARATUS

This invention claims priority based on a U.S. provisional application Ser. No. 63/186,107 filed May 8, 2021 titled BASE PLATE FOR PHOTOGRAPHIC EQUIPMENT whose teachings are incorporated herein by reference.

BACKGROUND OF THE INVENTION

This invention relates to an improved support base plate for preferably mounting thereon photographic equipment such as a photographic tripod head (also referred to herein as a "camera mount"), a camera, or any other suitable piece of equipment. In particular, a base plate embodying the invention includes a novel leveling arrangement which can be deployed quickly and easily.

Known prior art base plates, including one being manufactured by Applicant (which has many advantages over other prior plates), have certain problems and issues in their designs and operation.

A significant issue with the prior art relates to the insertion and removal of leveling screws in and from the base plate. The leveling screws may also be referred to as "spikes" since they may also be used to grip the underlying surface. As presently designed, each leveling screw has to be manually threaded in place each time the plate is used and has to be removed after use and then has to be stored. Also, the up-down movement of each leveling screw is limited to a perpendicular motion relative to the plate. Furthermore, after use, the leveling screws need to be completely removed and then stored, disconnected from the plate, for future use.

Other issues with prior art base plates include:
1. Closed belt slots which require the user to thread a belt through the plate prior to wrapping around an object.
2. No carrying handle.
3. Relatively small carabiner holes.
4. Five spike foot positions but none at the lower center of the plate.

SUMMARY OF THE INVENTION

The issues/problems discussed above are resolved in the present inventive base plate.

In accordance with the invention, there is provided a base plate to which is permanently attached leveling screw assemblies, each assembly containing a leveling screw, located within the assembly, to enable the leveling screw to: (a) be deployed at various selected angles relative to the base plate to grip an underlying surface; and (b) be rotated to enable up-down motion between the leveling screws and the base plate. The leveling screw can be retracted to a predetermine position alongside the base plate for safe permanent storage and ease of reuse.

Thus, a base plate embodying the invention includes novel leveling screw assemblies for controlling the leveling of the plate and enabling its deployment on different surfaces, quickly and easily. The novel leveling screw assemblies are positioned on, and attached to, the base plate. Each leveling screw assembly includes: (a) a rotatable threaded leveling screw so the screw and the plate can move up and down relative to each other; and (b) a control mechanism for selectively altering the angular positioning of its leveling screw relative to the plane (defined by the top and bottom surfaces) of the base plate.

Each control mechanism includes a rotatable threaded hub in which is threaded a leveling screw, with the hub and leveling screw being rotatable to selected positions in a plane perpendicular to the plane of the base plate. Thus each threaded hub enables its leveling screw to be rotated within the hub to provide up down motion and to be deployed at different angles to the base plate to provide gripping action with an underlying surface. As used herein and in the appended claims, the different selected positions define different deployed or deployment angles.

The control mechanism enables the leveling screw to be retracted so it can rest parallel to the side of the plate. Each leveling screw has a pointed tip at one end of the screw to enable the screw to provide gripping action to an underlying surface. The plate is designed such that the tips of the leveling screws, when in the retracted state, can nestle within a recess in the plate. This enables the permanent storing of the leveling screws with the base plate without concern that the tip of the leveling screw will cause any problem.

In one embodiment of the invention, the base plate, of given thickness, is of general of rectangular shape with first and second external sides extending generally parallel to each other between a front end and a back end. The plate has four (4) corner regions and a leveling screw assembly is attached to the top side of the base plate at each corner region. Thus, in one embodiment of the invention there are 4 leveling screw assemblies (which may also be referred to as "hinges"), each with a threaded screw with a pointed tip (also referred to as a "spike"), located at the 4 "corners" of the plate which can be deployed to any one of a number of predestined positions.

In the embodiments shown in the figures, the leveling screw is located exteriorly to the sides of the base plate. This enables, for example, the "inner" surface of the plate to have a cut out carrying handle.

Figure 1:
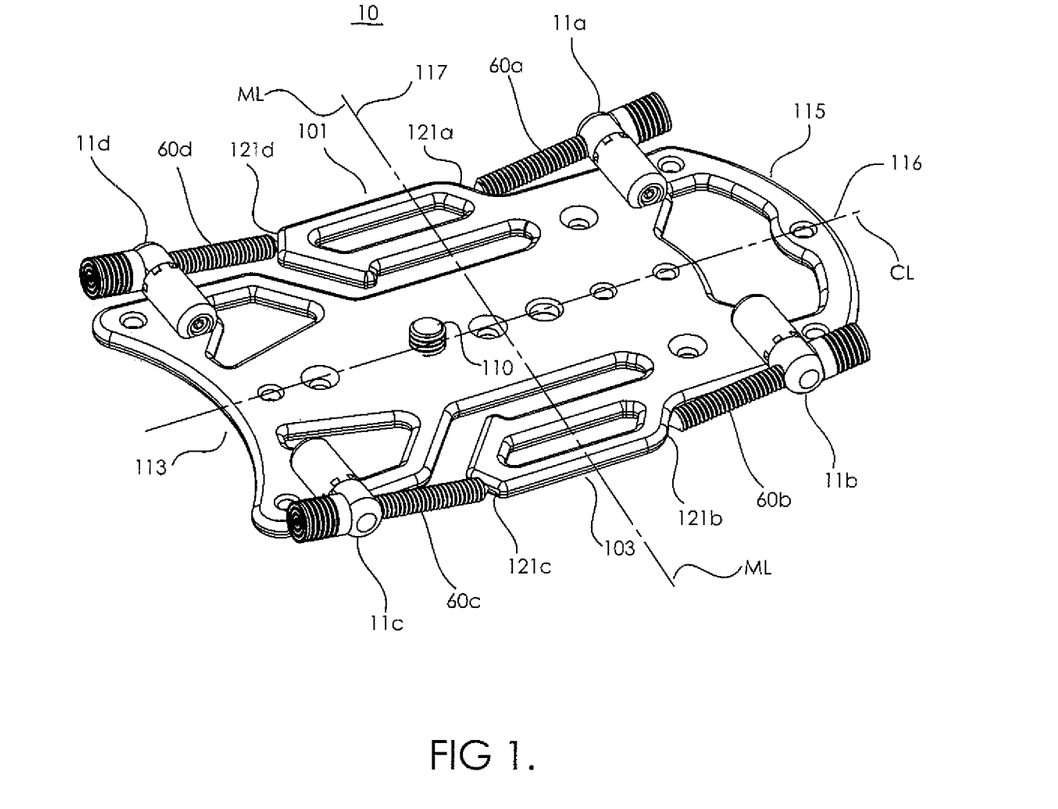
FIGS. 1 through 5 are isometric drawings of a base plate embodying the invention showing different possible positions of leveling screws (spikes) mounted on the base plate, in accordance with the invention.

When not in use, as shown in FIG. 1, the spikes are positioned generally parallel to the plate and the sharp screw tips are parked in small notches in the arms of the plate to avoid catching on any clothing or other objects.

Figure 15:
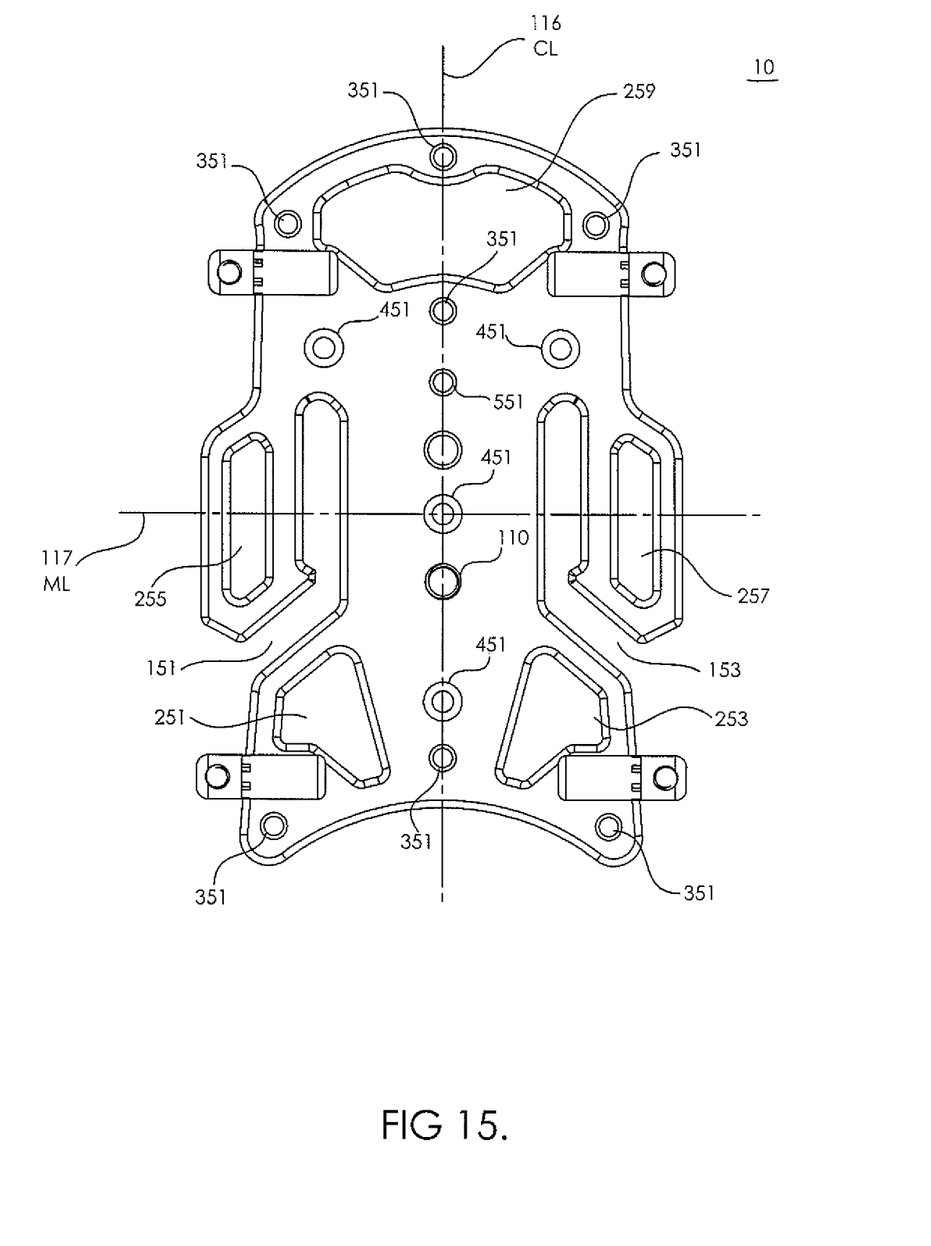
FIG. 15 is a simplified top view of a base plate embodying the invention showing various openings and holes to permit easier carrying and mounting, with the leveling screws omitted for ease of illustration.

Base plates embodying the invention may also include:
1. Open belt slots (as shown in FIG. 15) so a user can loosely strap a belt around a pole or tree and then just hook on the plate with the open belt slots.
2. Large cutout at front of plate (e.g., opening 259 at top of FIG. 15) allowing a user to comfortably carry the unit with three or four fingers.
3. Numerous openings (e.g., carabiner openings, 251, 253, 255, 257, 259 in FIG. 15) to enable coupling links (i.e., "carabiners") to be attached to the plate.
4. Numerous (e.g., 4) countersunk unthreaded holes (see holes 451 in FIG. 15), 2 laterally placed and 2 centrally placed, to accommodate #8 or #10 wood screws of any length.
5. Numerous threaded holes (e.g., 7, ¼"-20, holes 351 in FIG. 15) on the plate to accommodate extra spikes or goosenecks for added versatility.

BRIEF DESCRIPTION OF THE DRAWINGS

In the accompanying drawings, which are not all drawn to scale, like reference characters denote like components.

DETAILED DESCRIPTION OF THE INVENTION

Referring to the Figures, there is shown a support base plate 10 embodying the invention designed for the mounting thereon of photographic equipment such as a camera mount and/or a camera. However, it should be understood that a support base plate embodying the invention may be used to support any suitable piece of equipment.

In one embodiment, the base plate 10 was made to be approximately 5 inches in width, 8 inches in length and 5 millimeters thick. These dimensions are given for purpose of example only; the width, length and thickness of base plates 10 embodying the invention may be significantly greater or less than these dimensions. The base plate material may be aircraft grade aluminum or any other suitable material. The limitation on the base plate material is that it be relatively light in weight and sturdy. Any non-ferrous material including carbon fibers may be used to form the plate. The entire outer rim of the plate 10 is routed and rounded. This enables the plate to be placed in any pocket without cutting into the pocket due to sharp edges. For aesthetics, the plate may be black or color anodized with laser etched, design elements. Alternatively, the design may be embossed on the plate.

In the embodiment shown in FIGS. 1 through 5 there are four (4) individually controllable and rotatable screw leveling assemblies (11a, 11b, 11c, 11d) permanently secured to the base plate 10 at the 4 "corner regions" of the plate 10. The screw leveling assemblies ("hinges") do not have to be in the exact corner of the plate. The screw leveling assemblies (hinges), as shown, are symmetrically disposed along the side and top and bottom of the plate. However, it should be understood that asymmetric arrangements are also within the ambit of the invention.

Each screw leveling assembly (as shown in FIGS. 1-5) includes a leveling screw 60 (i.e., a spike), such that a first screw 60a is located at the upper left hand side of the plate, a second screw 60b is located at the upper right hand side of the plate, a third screw 60c is located at the lower right hand side of the plate, and a fourth screw 60d is located at the lower left hand side of the plate. The screws 60 have a pointed end 61, so when deployed and extended below the base plate, they can grip the surface below and thereby secure the base plate to the surface underlying the base plate. Each screw leveling assembly and each screw can be operated independently of any other assembly or screw.

In FIG. 1, the screws (spikes) are shown in what may be termed the retracted (or stored) position. The plate 10 includes small recesses 121 to enable the pointed end 61 of each spike to rest within its corresponding recess allowing the plate to be safely handled without sticking anything or anyone. Thus, in FIG. 1 there are shown four (4) recesses, 121a, 121b, 121c, and 121d.

Figure 2:
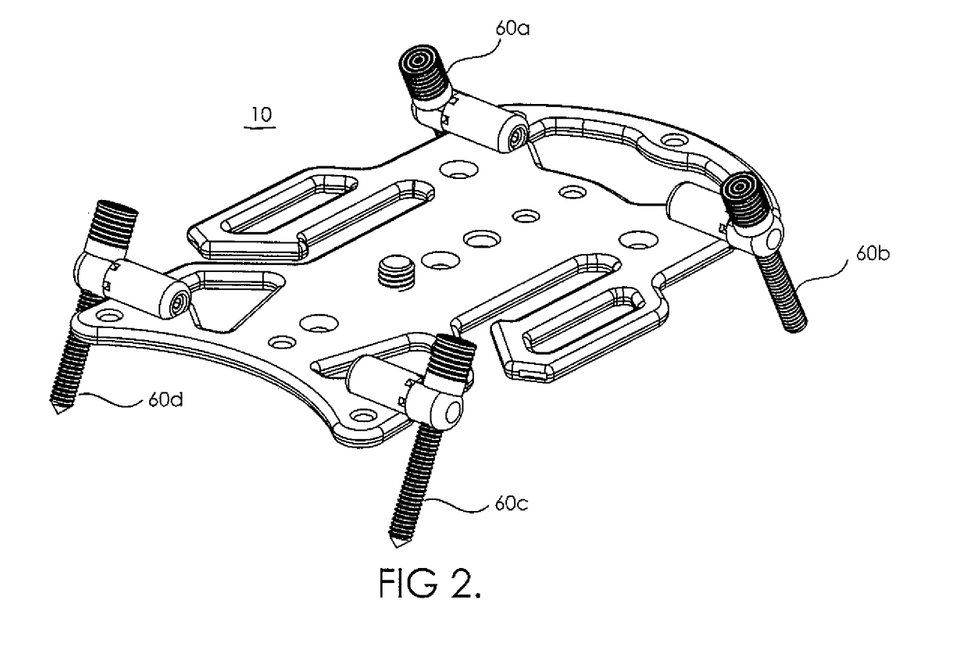
Figure 3:
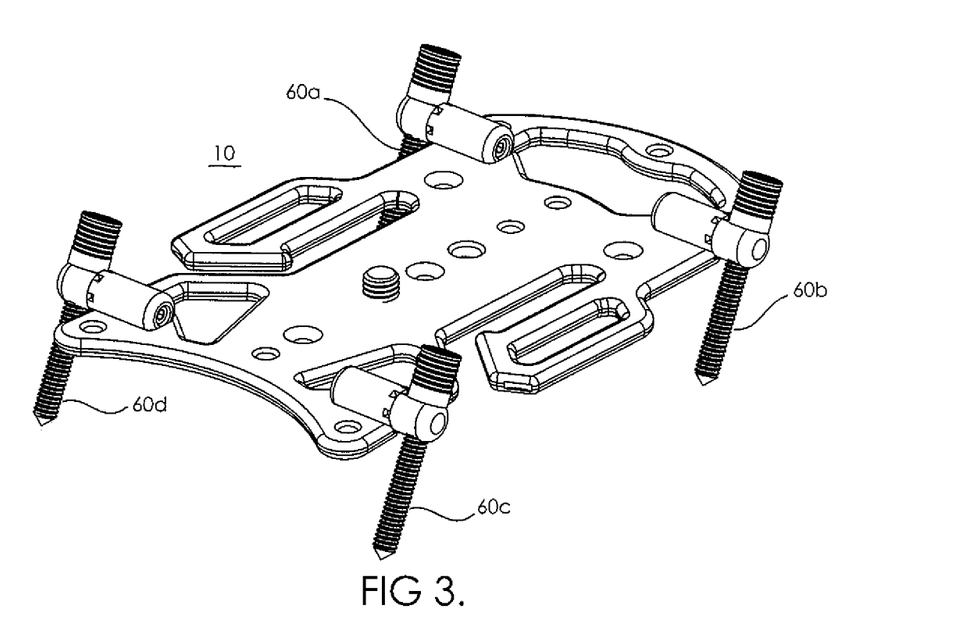
Figure 4:
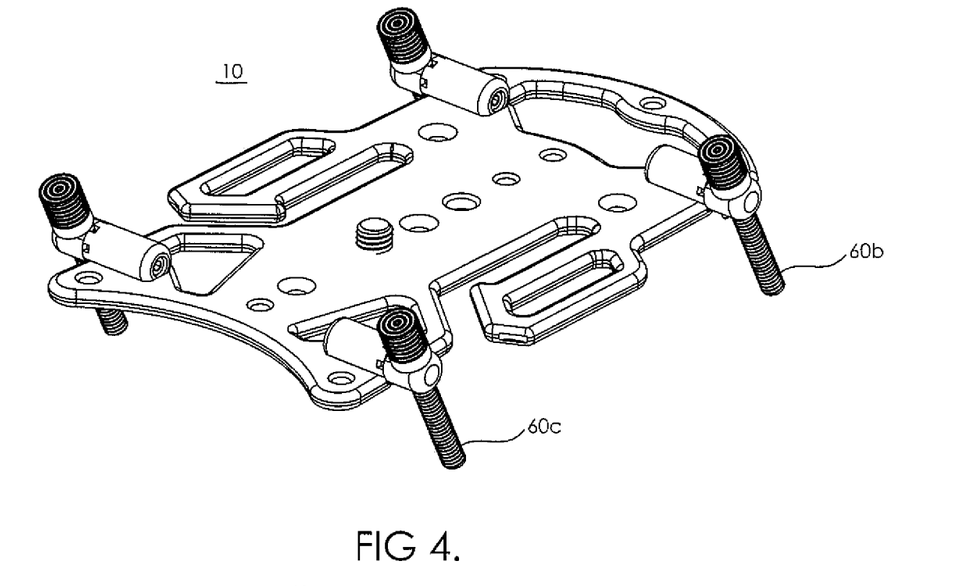

In FIGS. 2, 3 and 4 the screws (spikes) 60 are shown in different extended (angular) gripping positon. Each screw can be angularly deployed, or rotated, relative to the plane of the base plate from the retracted (parallel) position shown in FIG. 1 through a full circle.

When deployed to the position shown in FIG. 2, two spikes face forward and two spikes face rearward forming a trapezoid shape with the ground surface and the plate for maximum stability without needing to tighten the round nuts. In FIG. 3, the four spikes face rearward. In FIG. 4, the four spikes face forward.

Figure 5:
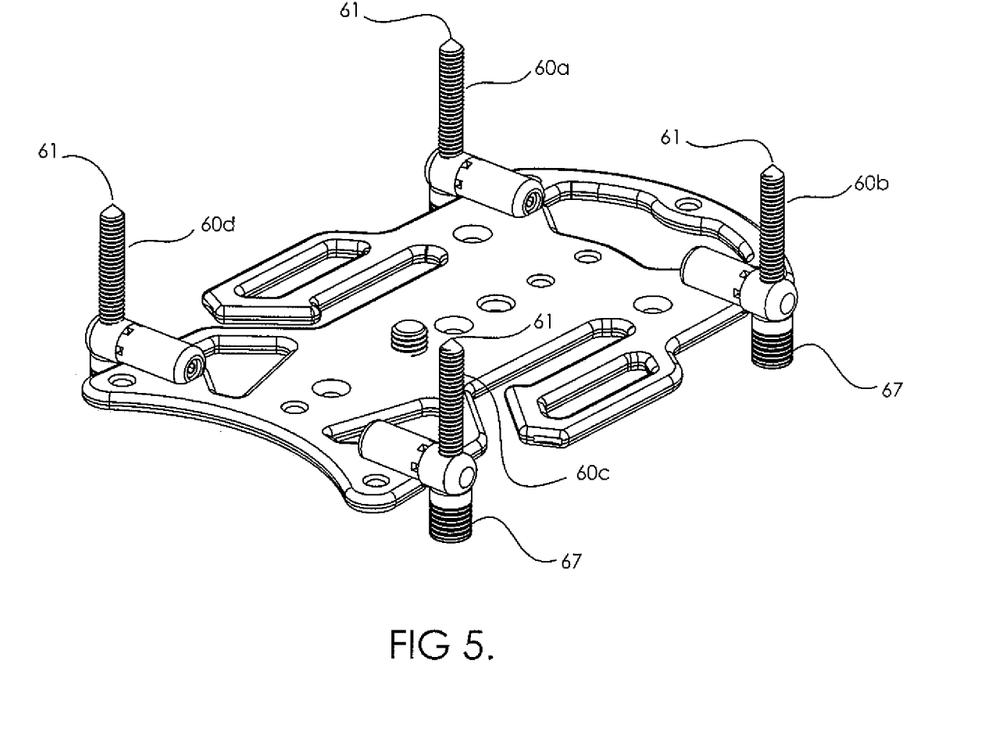

In FIG. 5 the screws are shown deployed perpendicularly to the plate 10 (having been rotated 90 degrees or 270 degrees) with their top rubber caps 67 below the plate and their pointed ends 61 pointing up. Note the caps 67 enable the screws to be manually rotated. The caps have a flat surface so they can rest on a surface without scratching.

The spikes 60 are fully adjustable and removable so that they may be deployed to any available position.

A significant aspect of the invention relates to the screw leveling assembly for enabling the up-down motion of the leveling screws, their angular deployment, and their storage. FIGS. 6-10 are different views of the components of a screw leveling assembly 11 embodying the invention. As detailed below, each leveling screw assembly 11 includes a rotatable threaded leveling screw 60 positioned within a hub 70 which is part of a control mechanism to enable the screw 60 and the plate 10 to move up and down relative to each other; and to enable varying the angular deployment of the leveling screw 60 in a plane perpendicular to the plane of the plate. FIGS. 6-10 illustrate how the screw 60 is coupled to the base plate and how the associated components enable the screw to be rotated to different positions, easily and rapidly.

Figure 6:
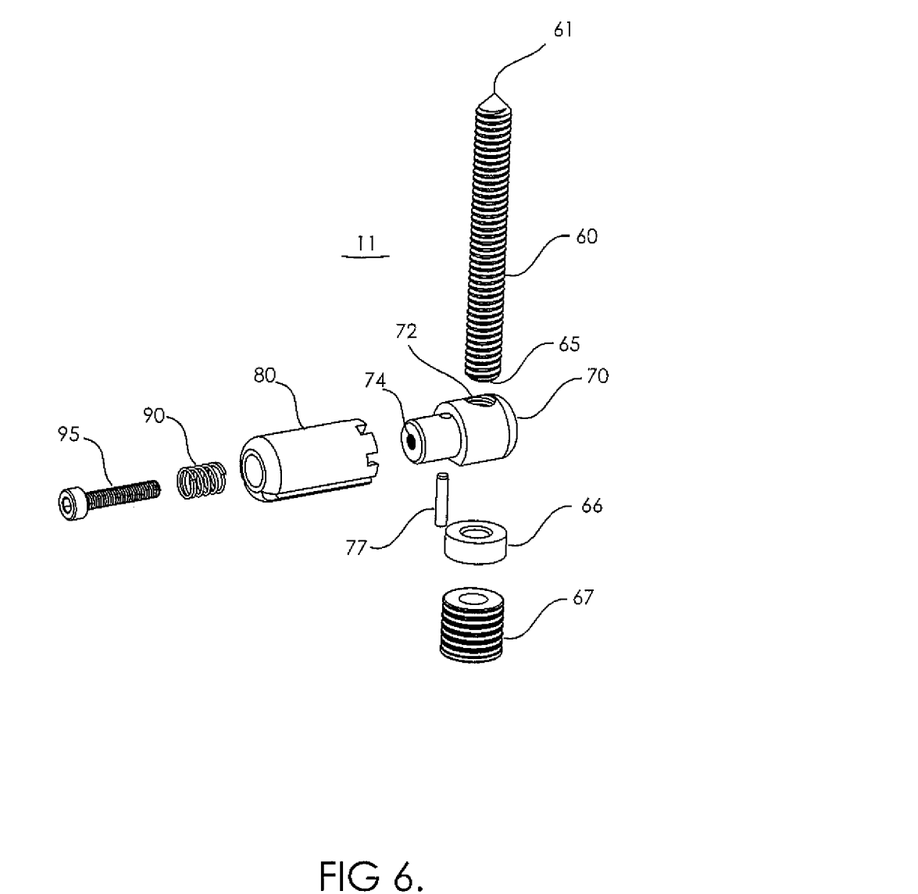
FIG. 6 is an exploded isometric view of a screw (spike) and associated components for mounting the screw on a base plate and for rotating the screw to different positions, in accordance with the invention.
Figure 7:
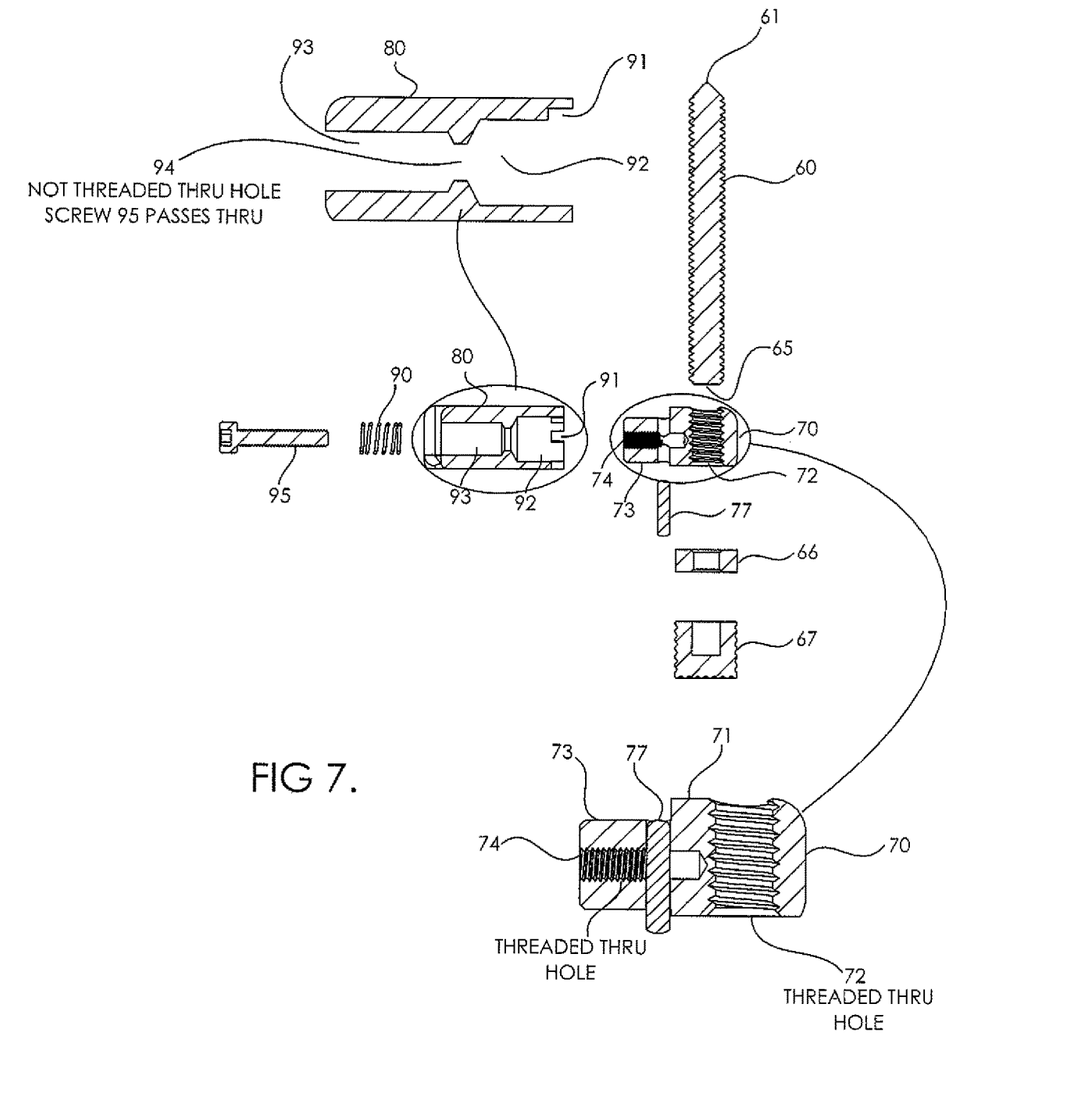
FIG. 7 is a cross-sectional view of some of the components shown in FIG. 6.

FIGS. 6 and 7 are exploded views of a screw (spike) 60 and the components used to rotate the screw (spike) and couple or secure it to the base plate. Each screw leveling assembly (hinge), 11, includes a gripping or leveling screw (spike) 60, a hub 70, a securing nut 66, a rubber cap 67, a locking positioning pin 77, a cylindrical sleeve 80, a spring 90 and a tightening screw 95.

Each screw (spike) 60 has a cylindrical threaded section coming to a point 61 at what will be referred to as the bottom (or gripping) end of the spike and a flat end 65 at what will be referred to herein as the top (or grasping) end of the screw (spike). A rubber cap 67 is mounted about the top flat end portion of the screw 60 to enable a user to grasp the top end of the screw and turn it so it moves up or down relative to the plate, depending on whether the screw is turned clockwise or counterclockwise. The rotation of the screw 60 is in a plane generally parallel to the plane of the base plate and determines the upward or downward movement of the plate 10. The rubber cap 67 provides a soft end and can also function as a stable support as shown in FIG. 5.

The screw (spike) 60 is threaded along most of its length and is passed through a correspondingly threaded hole 72 of hub 70. The hub 70 includes a first portion 71 (see FIG. 7) with a threaded thru-hole 72 for the threading of the screw 60. This enables the height adjustment of screw (spike) 60 to raise or lower the base plate. The threading also holds the spike 60 in place in hub 70. A tightening nut 66 further secures the height adjustment of the screw. The hub 70 includes a second generally cylindrical portion 73 extending in a generally perpendicular direction to the threaded hole 72. Portion 73 has a central threaded hole 74 for the threading and passing of tightening screw 95.

Figure 8:
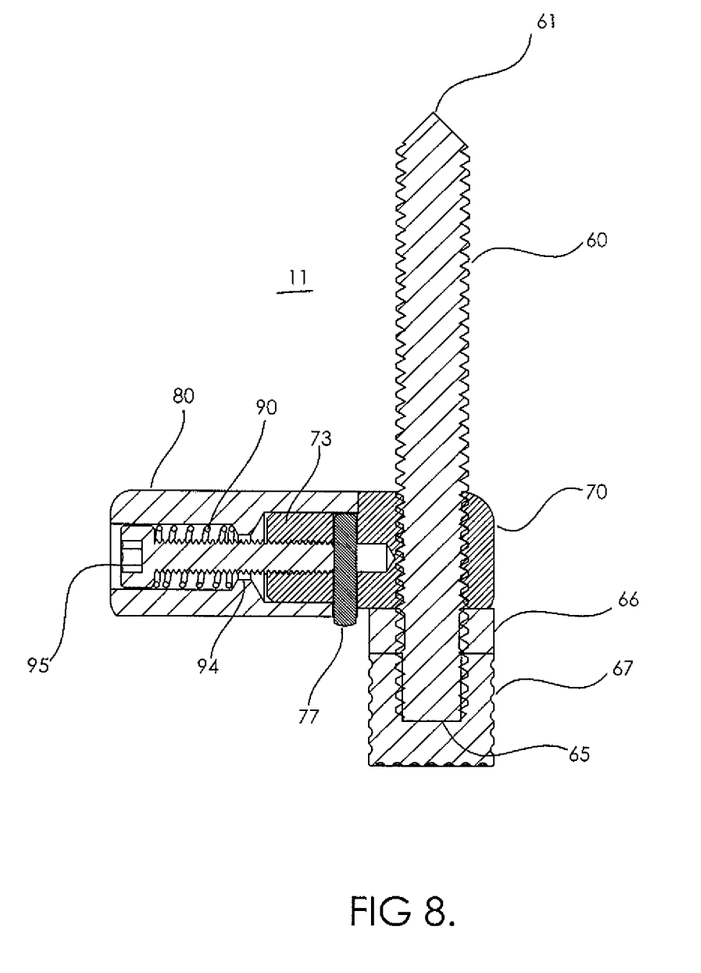
FIG. 8 is a cross-sectional drawing of the assembled components shown in FIGS. 6 and 7.

Portion 73, shown to the left of the spike in FIGS. 6-8, is designed to fit within a region 92 of cylindrical sleeve 80. The interior portion 73 has a central threaded hole 74, which extends into section 71, through which the tightening screw 95 is threaded and passes. Screw 95 thus advances a short distance within hub 70 and is thus attached to the hub. The interior portion 73 also includes means for enabling a locking positioning pin 77 to extend and fit into a selected notch 91 of the cylindrical sleeve 80 to lock the spike into a desired deployed position.

In cylindrical sleeve 80 there are formed positioning notches 91 into which positioning pin 77 is designed to fit. The internal walls of sleeve 80 are shaped to include two u-like shaped recesses 92, 93 with a neck 94 region formed between the two recesses 92, 93. The neck portion 94 is designed to allow passage of a tightening screw 95. As noted above, recess 92 is shaped to accommodate the placement therein of hub portion 73. Recess 93 is shaped for the placement therein of spring 90. The outer edge of sleeve 80 (on the right in FIGS. 6 and 7) is formed with positioning notches 91 (see FIG. 9). The number of notches formed along the outer rim of sleeve 80 determines the number of different positions through which a screw 60 can be rotated.

As shown in FIG. 8, when assembled, a securing screw 95 is inserted through the spring 90 in pocket 93. The screw 95 extends through neck 94, and into the threaded portion of hub 73 positioned within recess 92. The screw 95 is threaded into 70 and it is tightened against pin 77 to hold it in place.

In practice, assuming the screw 60 to be tightly secured to hub 70 via nut 66, when the hub 70 is pulled (e.g., to the right in FIG. 8) the screw 95 is pulled to the right and advances to the right compressing spring 90. Section 73 and pin 77 are disengaged from (free of) the notch 91 and the hub 70 and spike 60 can be rotated to any other notched position. Letting go of the hub, at a desired deployment position, enables the spring 90 to pull the hub 73 and lock the spike to the new position.

Figure 9:
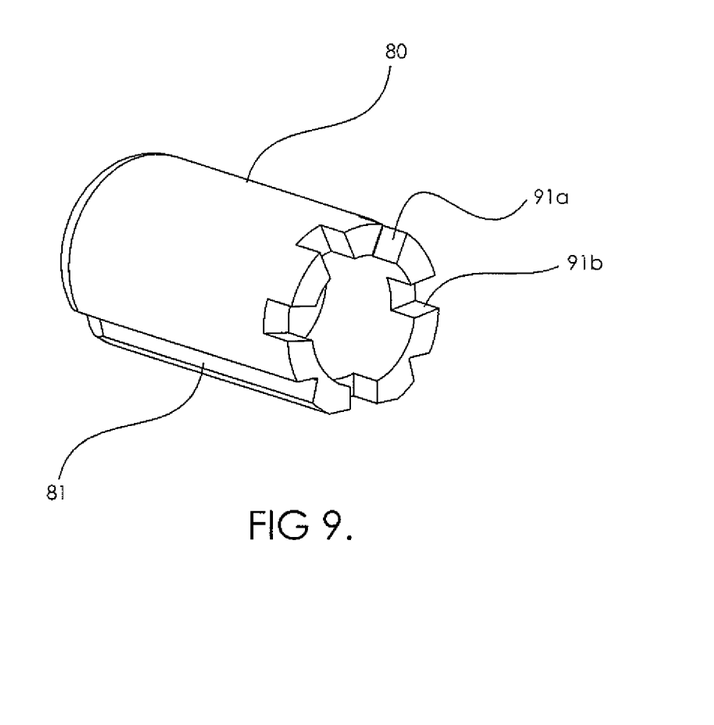
FIG. 9 is an isometric drawing of a cylindrical sleeve which can be used to practice the invention detailing positioning notches.
Figure 9A:
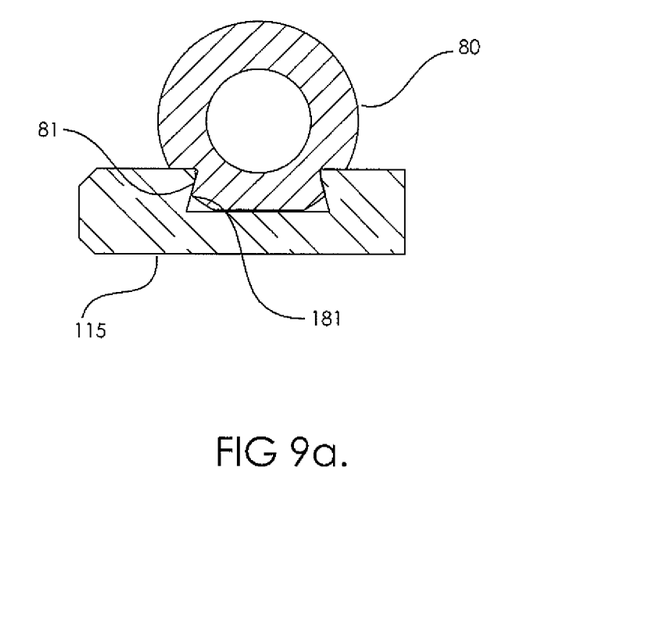
FIG. 9a is a cross-sectional drawing showing how the cylindrical sleeve of FIG. 9 is mounted and secured to the base plate.
Figure 10:
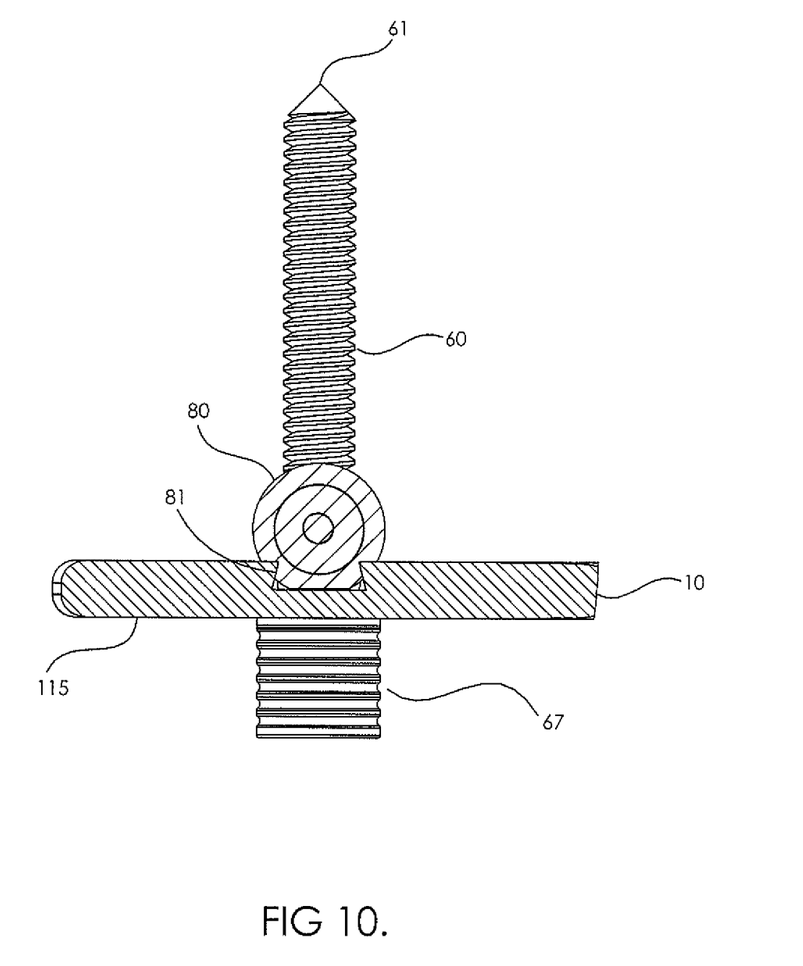
FIG. 10 is an isometric idealized end view showing a screw (spike) and its associated assembly (hinge) mounted on a base plate embodying the invention.

Cylindrical sleeve 80 is secured (firmly attached) to the base plate as shown in FIGS. 9 and 9a and 10. The outer shell of sleeve 80 includes a cut or notch 81 which is fitted into a corresponding notch 181 formed in the base plate. This dovetailing prevents the cylinder form rotating. In addition, sleeve 80 is held in place by a stop (not shown). Sleeve 80 is thus held securely in place. It is prevented from rotating or moving forward or backwards.

Figure 11:
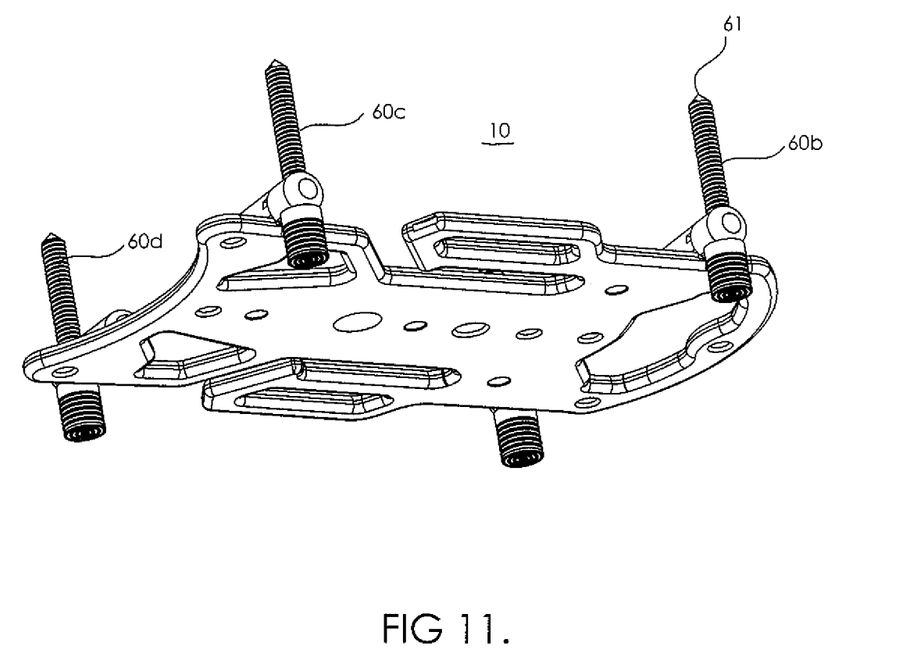
FIG. 11 is an isometric drawing providing a bottom view of the base plate of FIGS. 1-5.

FIG. 11 shows the underside of a base plate 10 to highlight that the underside is specifically made to provide a flat surface.

Figure 12:
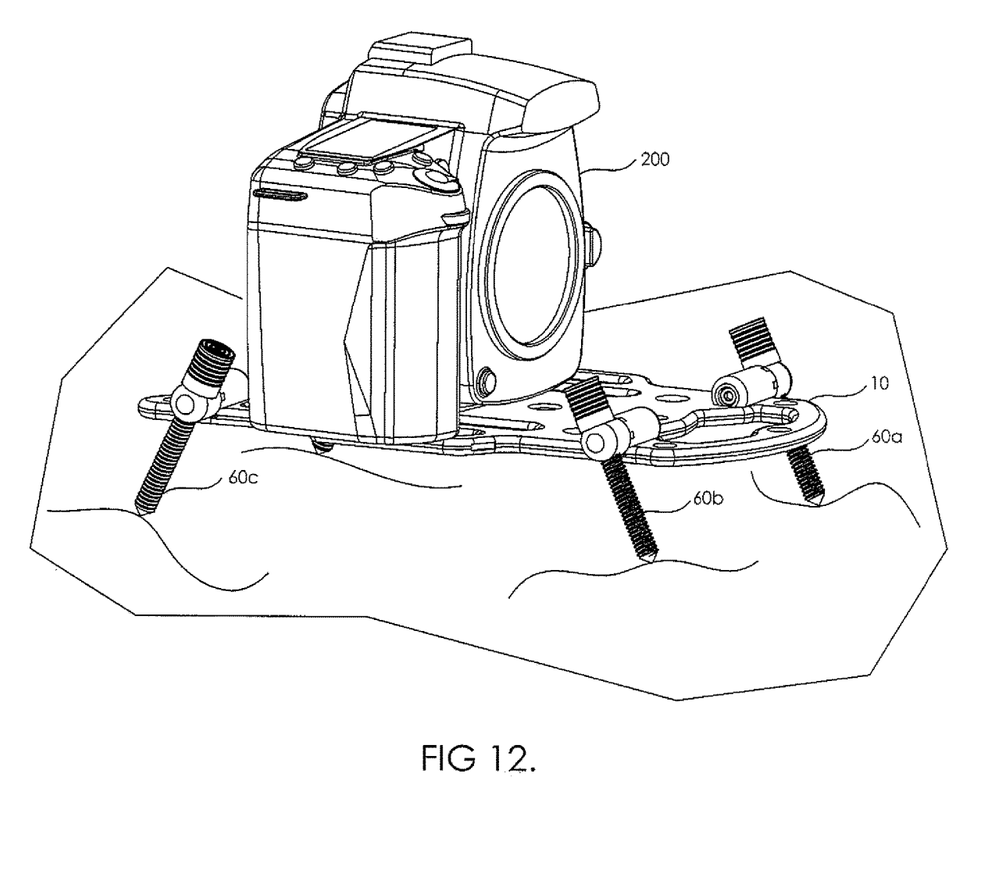
FIG. 12 is a highly simplified isometric view showing a camera mounted on a base plate embodying the invention being balanced on an uneven surface.

FIG. 12 shows a camera 200 directly mounted on a base plate 10 with the spikes (60a,b,c and 60d, not shown) extended in a trapezoidal pattern onto an irregular surface.

Figure 13:
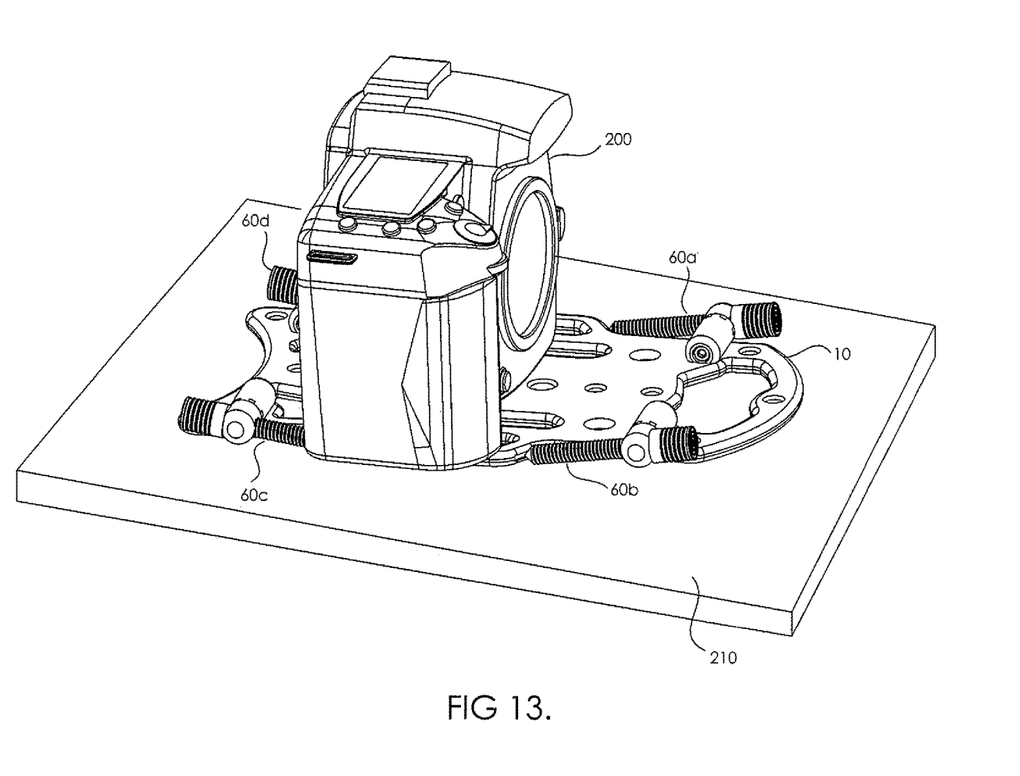
FIG. 13 is a highly simplified isometric diagram showing a camera mounted on a base plate embodying the invention resting securely on a flat surface (e.g., table top)

FIG. 13 shows a camera 200 directly mounted on a base plate 10 with the spikes (60a, b, c, d) in a retracted position and the base plate resting on a flat surface 210. This illustrates that the underside of the base plate is smooth and even thereby allowing the base plate to be deployed in this way.

Figure 14:
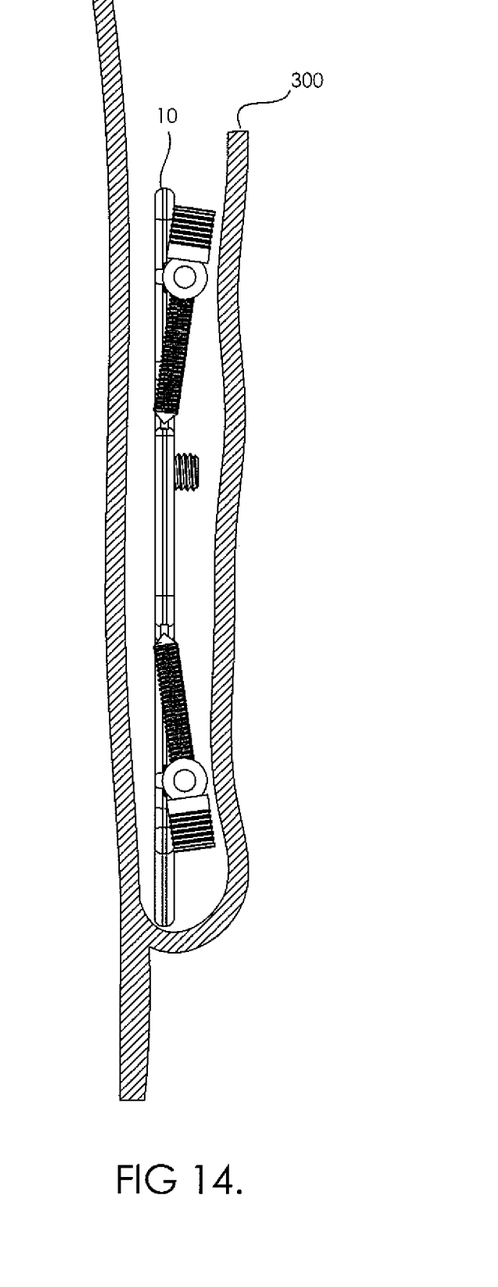
FIG. 14 is a diagram illustrating that a base plate embodying the invention can be easily folded and carried in a pocket of a user.

FIG. 14 shows the base plate 10 folded down and inserted into a pocket 300, which may be the pocket of a carry bag or virtually any pocket of apparel large enough to accommodate.

FIG. 15 is a top view of the base plate 10 (without the leveling screws) showing various holes and cut outs designed to give the base plate much utility. Certain aspects of a base plate embodying the invention are shown in FIG. 15. For example:

1. FIG. 15 shows open belt slots 151, 153 which can provide a much simpler method for attaching the plate to an object, such as a tree. A user can loosely strap a belt (not shown) around a pole or tree and to then just hook the plate onto the belt via the open slots, 151, 153. This provides a much simpler process to secure the base plate.
2. FIG. 15 shows a relatively large cutout (opening) 259 at the front end of plate 10 allowing a user to comfortably carry the base plate, and some attachments, with three or four fingers. Opening 259 can also serve as a carabiner opening.
3. FIG. 15 shows 5 potential carabiner openings (slots), 251, 253, 255, 257, and 259 to enable carabiners (coupling links) to be connected to a slot at front, side or rear of the base plate. Thus, carabiners can be attached via large slots at heel of plate, via carrying handle or via long slots in strap arms.
4. FIG. 15, also shows that there is provided 4 countersunk unthreaded holes 451, 2 laterally placed and 2 centrally placed, to accommodate #8 or #10 wood screws of any length.
5. FIG. 15 also shows that there is provide seven (7) threaded holes 351 on the plate to accommodate extra spikes or goosenecks for added versatility.

In the discussion above, reference has been made to the embodiments shown in the Figures. However, it should be appreciated that the invention is not limited to the particular embodiments. The base plate may have a different configuration than the generally rectangular one shown in the figures. That is, the base plate may even be triangular, ovate or circular. In all instances, the base plate is suitable for mounting a piece of photographic equipment such as, for example, a photographic tripod head (camera mount).

What is claimed is:

1. Apparatus for mounting photographic equipment comprising:
    a base plate of given width, length and thickness, with a front and a back end and first and second opposite sides extending between said front end and said back end, with the plate having top and bottom surfaces; and
    at least three leveling screw assemblies positioned on and attached to said base plate; each one of said leveling screw assemblies including: (a) a rotatable threaded leveling screw so the screw and the plate can move up and down relative to each other when the screw is rotated; and (b) a control mechanism for selectively altering the angular positioning of its leveling screw relative to the top and bottom surfaces of the base plate.
2. A base plate as claimed in claim 1, wherein said first and second sides extend generally parallel to each other and said top and bottom surfaces are generally parallel to each other; and wherein said leveling screw assemblies are symmetrically positioned.

3. A base plate as claimed in claim 2, wherein said base plate is of generally rectangular shape having four corner regions; and wherein a leveling screw assembly is located in each one of said corner regions.

4. A base plate as claimed in claim 2, wherein each rotatable threaded leveling screw has: (a) one end terminating in a point for, when deployed, gripping an underlying surface; and (b) an opposite end which is capped.

5. A base plate as claimed in claim 4, wherein each rotatable threaded leveling screw is retractable via said control mechanism to a position lying generally parallel to said first and second sides, and exteriorly to said sides.

6. A base plate as claimed in claim 2, wherein the control mechanism of each leveling screw assembly includes a spring loaded assembly enabling the manual angular deployment of each leveling screw to a different position relative to the plane of the base plate.

7. A base plate as claimed in claim 2, wherein each one of said threaded leveling screws can be retracted to a position parallel to the base plate; and wherein said base plate includes a recess formed in the base plate for each screw for nesting the tip of each screw about its designated recess.

8. A base plate as claimed in claim 2, wherein an opening is formed in the base plate for enabling the plate to be carried or mounted.

9. A generally rectangular base plate having first and second sides extending generally parallel to each other with a front end extending between the first and second sides and a back end extending between the first and second sides;
a first leveling screw assembly positioned in a region about the first side and the front end; a second leveling screw assembly positioned in a region about the second side and the front end; a third leveling screw assembly positioned in a region about the second side and the back end; and a fourth leveling screw assembly positioned in a region about the first side and the back end; and
each one of said leveling screw assemblies including a rotatable leveling screw and control apparatus for: (a) altering the angular positioning of it's leveling screw relative to the plane of the base plate; and (b) rotating the leveling screw so the leveling screw can move up and down relative to the plane of the base plate.

10. A generally rectangular base plate as claimed in claim 9, wherein each leveling screw has one end terminating in a point for gripping a surface and an opposite end which is capped; and wherein said control apparatus includes means for altering the deployment angle of the leveling screw and permitting the positioning of each leveling screw in a plane parallel with the plane of the base plate, defined as the retracted position; and wherein said base plate includes a recess formed in the base plate for each screw for nesting the tip of each screw about its designated recess.

11. Apparatus for mounting photographic equipment comprising:
a base plate of given width, length and thickness; and
leveling screw assemblies securely attached to said base plate;
each leveling screw assembly including a rotatable leveling screw and a retaining and controlling mechanism providing housing for the leveling screw while enabling the leveling screw to: (a) be deployed at various selected angles relative to the base plate in order to grip an underlying surface; and (b) be rotated to enable up-down motion between the leveling screws and the base plate.

12. Apparatus as claimed in claim 11 wherein each leveling screw assembly enables the leveling screw to be retracted to a predetermine position alongside the base plate for safe storage and ease of reuse and enables the leveling screw to be permanently housed.

13. Apparatus as claimed in claim 11 wherein each leveling screw is a threaded leveling screw mounted within a threaded hub forming part of the control mechanism, with the hub holding the screw so the screw can be rotated to provide up-down motion between the screw and the plate and the hub being rotatable to selected positions in a plane generally perpendicular to the plane of the base plate for altering the deployment angle of the levelling screw.

14. Apparatus as claimed in claim 13 wherein said hub is spring loaded to enable the hub to be manually rotated from one position to another selected position and to be firmly held in place in the selected position.

15. Apparatus as claimed in claim 14 wherein the base plate is of general rectangular shape with first and second external sides extending generally parallel to each other and having a front end and a back end; said first and second external sides and said front and back ends forming four (4) corner regions; and wherein a leveling screw assembly is attached to the top side of the base plate at each corner region.

16. Apparatus as claimed in claim 13 wherein the base plate includes open belt slots to enable the base plate to be attached to a selected object.

17. Apparatus as claimed in claim 13 wherein the base plate includes a large cutout to enable a user to comfortably carry base plate.

* * * * *